(12) United States Patent
Choi et al.

(10) Patent No.: US 8,805,279 B2
(45) Date of Patent: Aug. 12, 2014

(54) MOBILE DEVICE AND METHOD FOR PERFORMING FUNCTION BASED ON SHORT-RANGE COMMUNICATION

(75) Inventors: Jong Mu Choi, Gunpo-si (KR); Jun Ho Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 13/370,741

(22) Filed: Feb. 10, 2012

(65) Prior Publication Data
US 2012/0208461 A1 Aug. 16, 2012

(30) Foreign Application Priority Data
Feb. 11, 2011 (KR) .................. 10-2011-0012377

(51) Int. Cl.
*H04B 7/00* (2006.01)
(52) U.S. Cl.
USPC .................. 455/41.2; 455/41.1; 455/507

(58) Field of Classification Search
USPC ........................ 455/41.1, 41.2, 507
See application file for complete search history.

(56) References Cited

U.S. PATENT DOCUMENTS 7,940,180 B2 * 5/2011 Ohashi et al. .............. 340/572.1

* cited by examiner

*Primary Examiner* — Tuan H Nguyen
(74) *Attorney, Agent, or Firm* — Jefferson IP Law, LLP

(57) ABSTRACT

A mobile device and method for performing a function using a short-range communication tag are provided. In the method, the mobile device inputs function-related information into a short-range communication tag, and recognizes proximity to or contact with the short-range communication tag. Then the mobile device reads the function-related information from the short-range communication tag, and performs a function correlated with the function-related information. This allows performing various functions of the mobile device, only depending on a user's action to bring the mobile device in proximity to or contact with the Near Field Communication (NFC) tag.

18 Claims, 16 Drawing Sheets

(a)

(b)

(c)

MOBILE DEVICE AND METHOD FOR PERFORMING FUNCTION BASED ON SHORT-RANGE COMMUNICATION

PRIORITY

This application claims the benefit under 35 U.S.C. §119 (a) of a Korean patent application filed on Feb. 11, 2011 in the Korean Intellectual Property Office and assigned Serial No. 10-2011-0012377, the entire disclosure of which is hereby incorporated by reference.

BACKGROUND OF THE INVENTION

1. Field of the Invention

The present invention relates to a mobile device technology based on a short-range communication. More particularly, the present invention relates to a mobile device and method for performing a function using a short-range communication tag.

2. Description of the Related Art

With the remarkable growth of related technologies, a great variety of mobile devices are increasingly popular and currently available. Mobile devices not only provide a voice call service, but also offer several data transmission services and various additional services, thus evolving into multimedia communication devices.

Some mobile devices introduced recently have a Near Field Communication (NFC) module to execute NFC-based services. Currently, these mobile devices perform a function to read information from an NFC tag or to transmit information to other mobile devices having an NFC module.

However, in view of user's convenience, NFC-based services still have plenty of room for further improvement.

SUMMARY OF THE INVENTION

Aspects of the present invention are to address at least the above-mentioned problems and/or disadvantages and to provide at least the advantages described below. Accordingly, an aspect of the present invention is to provide a method for performing a function of a mobile device by using a Near Field Communication (NFC) tag in order to enhance user's convenience.

Another aspect of the present invention is to provide a mobile device for realizing the above method.

According to an aspect of the present invention, a method for performing a function of a mobile device by using a short-range communication is provided. The method includes inputting function-related information into a short-range communication tag, recognizing proximity to or contact with the short-range communication tag, reading the function-related information from the short-range communication tag, and performing a function correlated with the function-related information.

According to another aspect of the present invention, a mobile device for performing a function thereof by using a short-range communication is provided. The mobile device includes an information inputting unit configured to input function-related information into a short-range communication tag, a short-range communication module unit configured to detect proximity to or contact with the short-range communication tag, an information reading unit configured to read the function-related information from the short-range communication tag, and a function performing unit configured to perform a function correlated with the function-related information.

Various aspects of this invention may allow performing a function of the mobile device, connecting the mobile device to a specific Bluetooth or Wi-Fi device, updating application-related data of the mobile device, and outputting data stored in the mobile device through an external electronic device, only depending on a user's action to bring the mobile device in proximity to or contact with the NFC tag.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile device according to exemplary embodiments of this invention is a device having a short-range communication module, and may be embodied as a mobile communication terminal, a Portable Multimedia Player (PMP), a Personal Digital Assistant (PDA), a smart phone, an MP3 player, and any other electronic device or multimedia player.

The short-range communication module in this invention may include, but is not limited to, a Near Field Communication (NFC) module, a Bluetooth module, a Wi-Fi module, a Zigbee communication module, an infrared communication module, or the like. A disclosure set forth herein is based on the assumption that the mobile device essentially includes the NFC module.

Figure 1:
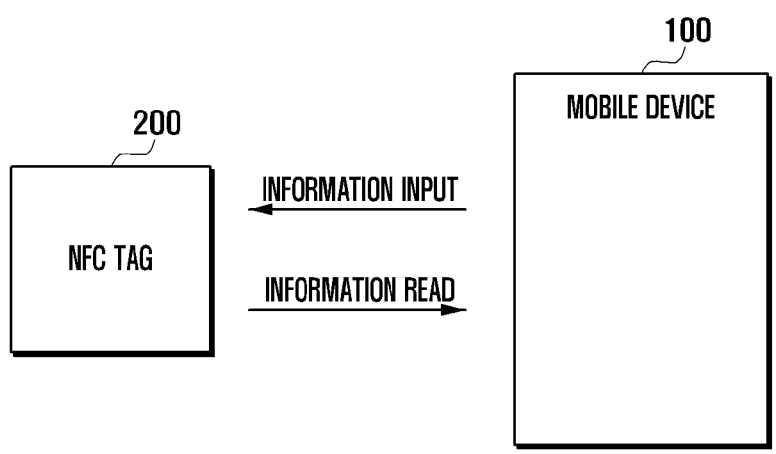
FIG. 1 is a schematic diagram illustrating a basic scheme of a Near Field Communication (NFC) service system using an NFC tag in accordance with an exemplary embodiment of the present invention.

FIG. 1 is a schematic diagram illustrating a basic scheme of an NFC service system using an NFC tag in accordance with an exemplary embodiment of the present invention.

Referring to FIG. 1, an NFC service available for a short-range communication (within 10 km) is used for electronic payment, data communication, etc. and uses a specific frequency band (e.g., 13.56 MHz). The NFC service system includes a mobile device 100 and an NFC tag 200.

The mobile device 100, carried by a user, has an NFC module that can input information into the NFC tag 200 and also can read information from the NFC tag 200. Additionally, the mobile device 100 has a Wi-Fi module that performs a connection with any Wi-Fi device through an access point, or a Bluetooth module that performs a connection with any Bluetooth device.

The NFC tag 200 is a kind of memory device and stores prescribed information. More specifically, the NFC tag 200 may store a service identifier, also referred to as a unique identifier, and service data, also referred to as NFC data exchange format data. In exemplary embodiments of this invention, the NFC tag 200 not only stores webpage links, email links, and phone numbers, designated by a user, but also stores connection information about short-range communication devices to be connected, connection information about access points to be connected, identification information about applications to be executed, web addresses (e.g., Uniform Resource Links (URLs)) to be accessed when applications are selectively executed, identification information about electronic devices to output data, and the like. In an exemplary implementation, the NFC tag 200 has an attachable/detachable form so that a user can attach it to a desired place or device.

In this disclosure, the NFC tag 200 is described as, but is not limited to, a 'short-distance communication tag'. Alternatively, any other memory chip type tags used in short-range communications may be favorably used.

Figure 2:
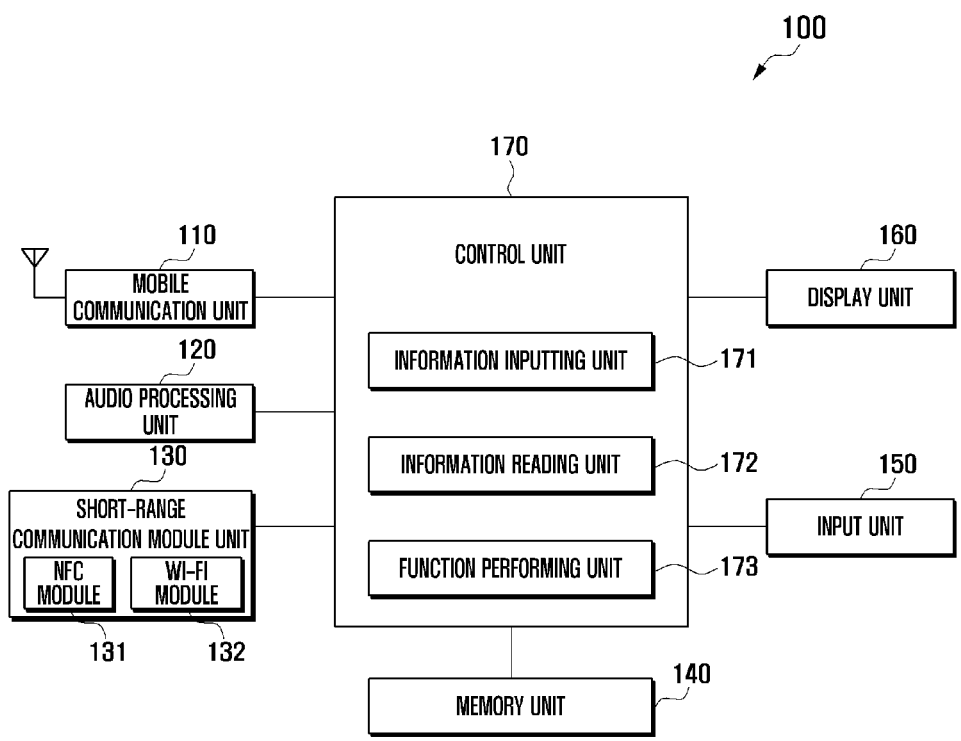
FIG. 2 is a block diagram illustrating a mobile device in accordance with an exemplary embodiment of the present invention.

FIG. 2 is a block diagram illustrating a mobile device in accordance with an exemplary embodiment of the present invention.

Referring to FIG. 2, the mobile device 100 includes a mobile communication unit 110, an audio processing unit 120, a short-range communication module unit 130, a memory unit 140, an input unit 150, a display unit 160, and a control unit 170.

The mobile communication unit 110 performs a function to transmit and receive data for wireless communication of the mobile device 100. Normally, the mobile communication unit 110 may include a Radio Frequency (RF) transmitter that up-converts the frequency of an outgoing signal and amplifies the signal, an RF receiver that amplifies with low-noise an incoming signal and down-converts the frequency of the signal, and the like. Additionally, the mobile communication unit 110 may receive data through a wireless channel and output it to the control unit 170, and also receive data from the control unit 170 and transmit it through a wireless channel.

The audio processing unit 120 may include a codec which may be composed of a data codec for processing packet data and an audio codec for processing an audio signal such as a voice. The audio processing unit 120 converts a digital audio signal into an analog audio signal through the audio codec and outputs it through a speaker, and also convents an analog audio signal received from a microphone into a digital audio signal through the audio codec.

The short-range communication module unit 130 is an element that performs a short-range communication with any external device located within a specific range. In an exemplary implementation, the short-range communication module unit 130 includes an NFC module 131 and a Wi-Fi module 132. This is, however, exemplary only and not to be considered as a limitation of the present invention. In another exemplary embodiment, the short-range communication module unit 130 may further include a Bluetooth communication module, a Zigbee communication module, a Radio Frequency IDentification (RFID) module, or the like.

The NFC module 131 detects proximity to or contact with the NFC tag 200, creates a detection signal, and sends it to the control unit 170. The NFC module 131 inputs information into the NFC tag 200 or reads information from the NFC tag 200 under the control of the control unit 170.

The Wi-Fi module 132 is connected to any Access Point (AP) or to any external device having a Wi-Fi module and establishes a communication channel. The Wi-Fi module 132 performs a scan throughout all channels, sends a probe request to the APs or external devices, and receives a probe response from the APs or external devices. By doing so, the mobile device 100 can search the APs or external devices. When receiving a connecting command from the control unit 170, the Wi-Fi module 132 is connected to a selected AP or external device and thereby establishes a communication channel.

The short-range communication module unit 130 may further include the Bluetooth module that searches for neighboring Bluetooth devices by broadcasting an inquiry signal and receiving a response signal. When receiving a pairing and connecting command from the control unit 170, the Bluetooth module performs a pairing and connecting process with a selected Bluetooth device and thereby establishes a communication channel.

The memory unit 140 stores programs and data required for operations of the mobile device 100 and may consist of a program region and a data region. The program region may store an Operating System (OS) and programs for booting and operating the mobile device 100, applications required for the playback of multimedia contents, and applications required for the execution of various optional functions of the mobile device 100, such as a camera function, a sound reproduction function, an image or video playback function, and the like. The data region stores data created while the mobile device 100 is used, such as an image, a video, a phonebook, an audio, etc.

The input unit 150 receives a user's key manipulation for controlling the mobile device 100, creates a corresponding input signal, and delivers it to the control unit 170. The input unit 150 may be formed of a keypad based on the 3*4 or QWERTY key layout and having alphanumeric keys and navigation keys. Alternatively or additionally, the input unit 150 may be formed of a touch panel, a button key, a jog key, a wheel key, and the like. Depending on a user's input action, the input unit 150 creates various input signals for performing functions (e.g., a call function, a video or music playback function, an image display function, a broadcast receiving function, a camera function, etc.) of the mobile device 100 and sends them to the control unit 170.

The display unit 160 may be formed of a Liquid Crystal Display (LCD), an Organic Light Emitting Diode (OLED), an Active Matrix OLED (AMOLED), or any equivalent. The display unit 160 visually offers a menu, input data, function setting information, and any other various information of the mobile device 100 to a user. The display unit 160 performs a function to output a booting screen, an idle screen, a menu screen, a call screen, or any other application screens of the mobile device 100.

The control unit 170 performs various functions to control operations of the mobile device 100. The control unit 170, according to an exemplary embodiment of this invention, includes an information inputting unit 171, an information reading unit 172, and a function performing unit 173.

The information inputting unit 171 inputs information into the NFC tag 200 through the NFC module 131. More particularly, the information inputting unit 171 inputs information related to functions to be performed by the mobile device 100 into the NFC tag 200. The information inputting unit 171 recognizes that a menu item for the registration of a Bluetooth or Wi-Fi device is selected in a tag menu, and determines whether any Bluetooth or Wi-Fi device is currently connected. If there is a connected Bluetooth or Wi-Fi device, the information inputting unit 171 controls the display unit 160 to display a list of the connected Bluetooth or Wi-Fi devices. The information inputting unit 171 recognizes a selection of a certain device in the list through the input unit 150 and, when recognizing proximity to or contact with the NFC tag 200 through the NFC module 131, inputs connection information about the selected device into the NFC tag 200. If a connected device is a Bluetooth device, connection information may be a Bluetooth ADDRess (BD_ADDR) and a Personal Identity Number (PIN) code. If a connected device is a Wi-Fi device, connection information may be a Service Set IDentifier (SSID), a security type, and a password.

If no Bluetooth or Wi-Fi device is connected, the information inputting unit 171 controls the display unit 160 to display an input window for receiving connection information about Bluetooth or Wi-Fi devices. The information inputting unit 171 receives connection information in the input window from the input unit 150 and, when recognizing proximity to or contact with the NFC tag 200 through the NFC module 131, inputs the received connection information into the NFC tag 200.

In another exemplary embodiment, the information inputting unit 171 recognizes that a menu item for data synchronization is selected in the tag menu, and controls the display unit 160 to display a list of applications installed in the mobile device 100. The information inputting unit 171 recognizes a selection of a certain application in the list through the input unit 150 and, when recognizing proximity to or contact with the NFC tag 200 through the NFC module 131, inputs identification information about the selected application and a web address to be accessed into the NFC tag 200.

Additionally, when recognizing a selection of a certain application in the application list through the input unit 150, the information inputting unit 171 may determine whether the mobile device 100 is currently connected to any AP through the Wi-Fi module 132. If so, the information inputting unit 171 controls the display unit 160 to display connection information about the connected AP and, when recognizing proximity to or contact with the NFC tag 200 through the NFC module 131, inputs identification information about the selected application, a web address to be accessed, and connection information about the connected AP into the NFC tag 200.

If the mobile device 100 is not connected to any AP, the information inputting unit 171 controls the display unit 160 to display an input window for receiving connection information about APs. The information inputting unit 171 receives AP connection information in the input window from the input unit 150 and, when recognizing proximity to or contact with the NFC tag 200 through the NFC module 131, inputs identification information about the selected application, a web address to be accessed, and the received AP connection information into the NFC tag 200.

In still another exemplary embodiment, the information inputting unit 171 performs a connection with any AP through the Wi-Fi module 132 and, when recognizing that a menu item for the registration of an electronic device is selected in the tag menu through the input unit 150, controls the display unit 160 to display a list of electronic devices coupled to the currently connected AP. The information inputting unit 171 recognizes a selection of a certain electronic device in the list through the input unit 150 and, when recognizing proximity to or contact with the NFC tag 200 through the NFC module 131, inputs connection information about the currently connected AP and identification information about the selected electronic device into the NFC tag 200.

Additionally, when recognizing a selection of the electronic device registration menu item in the tag menu through the input unit 150, the information inputting unit 171 may control the display unit 160 to display an input menu for AP connection information and electronic device identification information. The information inputting unit 171 receives AP connection information and electronic device identification information from the input unit 150 and, when recognizing proximity to or contact with the NFC tag 200 through the NFC module 131, inputs the received AP connection information and electronic device identification information into the NFC tag 200.

The information reading unit 172 reads information from the NFC tag 200. According to exemplary embodiments of this invention, the information reading unit 172 may read Bluetooth device connection information, such as a BD_ADDR and a PIN code, or Wi-Fi device connection information, such as an SSID, a security type, and a password. Additionally, the information reading unit 172 may read, from the NFC tag 200, identification information about an application to be executed and a web address to be accessed. In this case, the information reading unit 172 may further read, from the NFC tag 200, connection information about an AP to be connected. In some exemplary embodiments of this invention, the information reading unit 172 may read, from the NFC tag 200, connection information about an AP to be connected and identification information about an electronic device to output data.

The function performing unit 173 performs a function on the basis of information read from the NFC tag 200. If the information reading unit 172 reads connection information about a Bluetooth device from the NFC tag 200, the function performing unit 173 performs a connection with the Bluetooth device according to the read connection information. Also, if the information reading unit 172 reads connection information about a Wi-Fi device from the NFC tag 200, the function performing unit 173 performs a connection with the Wi-Fi device according to the read connection information.

In another exemplary embodiment, if the information reading unit 172 reads, from the NFC tag 200, identification information about an application to be executed and a web address to be accessed, the function performing unit 173 executes the application according to the read identification information and accesses a web server through the mobile communication unit 110 or the Wi-Fi module 132 according to the read web address. If the information reading unit 172 further reads connection information about an AP, the function performing unit 173 may perform a connection with the AP by controlling the Wi-Fi module 132 according to the read connection information, execute the application according to the read identification information, and access a web server through the AP connected according to the read web address.

In still another exemplary embodiment, if the information reading unit 172 reads, from the NFC tag 200, connection information about an AP and identification information about an electronic device, the function performing unit 173 performs a connection with the AP by controlling the Wi-Fi module 132 according to the read connection information, searches for the electronic device according to the read identification information, and transmits prescribed data to the electronic device.

Figure 3:
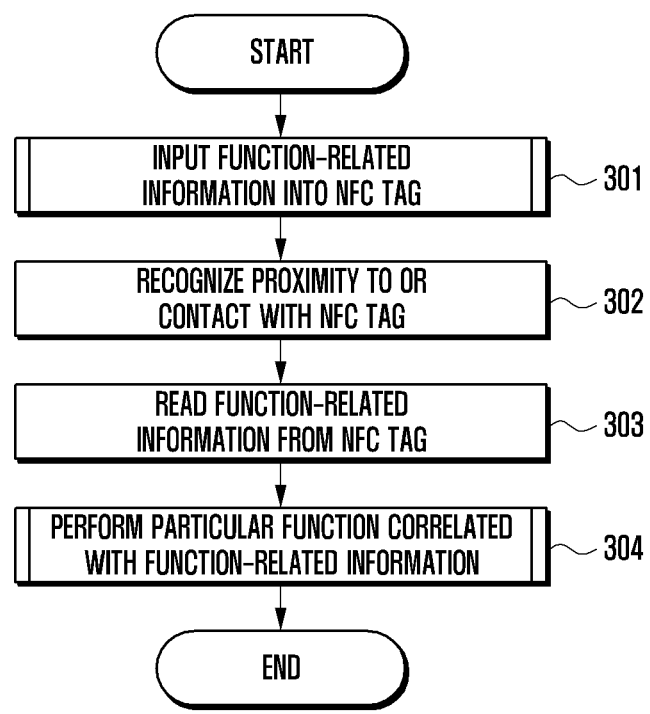
FIG. 3 is a flow diagram illustrating a method in which a mobile device performs a function by using an NFC tag in accordance with an exemplary embodiment of the present invention.

FIG. 3 is a flow diagram illustrating a method in which a mobile device performs a function by using an NFC tag in accordance with an exemplary embodiment of the present invention.

Referring to FIG. 3, the information inputting unit 171 inputs information related to the execution of functions (hereinafter, also referred to as function-related information) into the NFC tag 200 by controlling the NFC module 131 in step 301. Function-related information may vary according to the function to be performed by the mobile device 100 and may include connection information about a Bluetooth device to be connected, connection information about a Wi-Fi device to be connected, identification information about an application to be executed, a web address of a web server to be accessed, identification information about an electronic device to output contents being currently executed, and the like. While the NFC module 131 is in a state of proximity to or contact with the NFC tag 200, the information inputting unit 171 inputs function-related information into the NFC tag 200. A more detailed process of step 301 will be described later with reference to FIGS. 5, 7, 9, 12 and 13. The NFC tag 200 into which information is input is attached to a certain place or device.

In step 302, the control unit 170 recognizes, through the NFC module 131, that the mobile device 100 is in proximity to or contact with the NFC tag 200. More specifically, when a user brings the mobile device 100 in proximity to or contact with the NFC tag 200 attached to some place or device, the NFC module 131 detects proximity to or contact with the NFC tag 200, creates a detection signal, and sends it to the control unit 170. The control unit 170 receives the detection signal from the NFC module 131 and hence recognizes proximity to or contact with the NFC tag 200.

In step 303, the information reading unit 172 reads function-related information from the NFC tag 200 by controlling the NFC module 131. In step 303, the information reading unit 172 may read Bluetooth device connection information, such as a Bluetooth address and a PIN code, or Wi-Fi device connection information, such as an SSID, a security type, and a password. In another exemplary embodiment, the information reading unit 172 may read, from the NFC tag 200, identification information about an application to be executed and a web address to be accessed. In this case, the information reading unit 172 may further read, from the NFC tag 200, connection information about an AP to be connected. In still another exemplary embodiment, the information reading unit 172 may read, from the NFC tag 200, connection information about an AP to be connected and identification information about an electronic device to output data. The information reading unit 172 sends the read function-related information to the function performing unit 173.

In step 304, the function performing unit 173 performs a function correlated with the function-related information that is read by the information reading unit 172. If the information reading unit 172 reads connection information about a Bluetooth device from the NFC tag 200, the function performing unit 173 performs a connection with the Bluetooth device according to the read connection information. Also, if the information reading unit 172 reads connection information about a Wi-Fi device from the NFC tag 200, the function performing unit 173 performs a connection with the Wi-Fi device according to the read connection information.

If the information reading unit 172 reads, from the NFC tag 200, identification information about an application to be executed and a web address to be accessed, the function performing unit 173 executes the application according to the read identification information, and accesses a web server through the mobile communication unit 110 or the Wi-Fi module 132 according to the read web address. If the information reading unit 172 reads, from the NFC tag 200, connection information about an AP and identification information about an electronic device, the function performing unit 173 performs a connection with the AP by controlling the Wi-Fi module 132 according to the read connection information, searches for the electronic device according to the read identification information, and transmits prescribed data to the electronic device. A more detailed process of step 304 will be described later with reference to FIGS. 8, 10 and 14.

Figure 4:
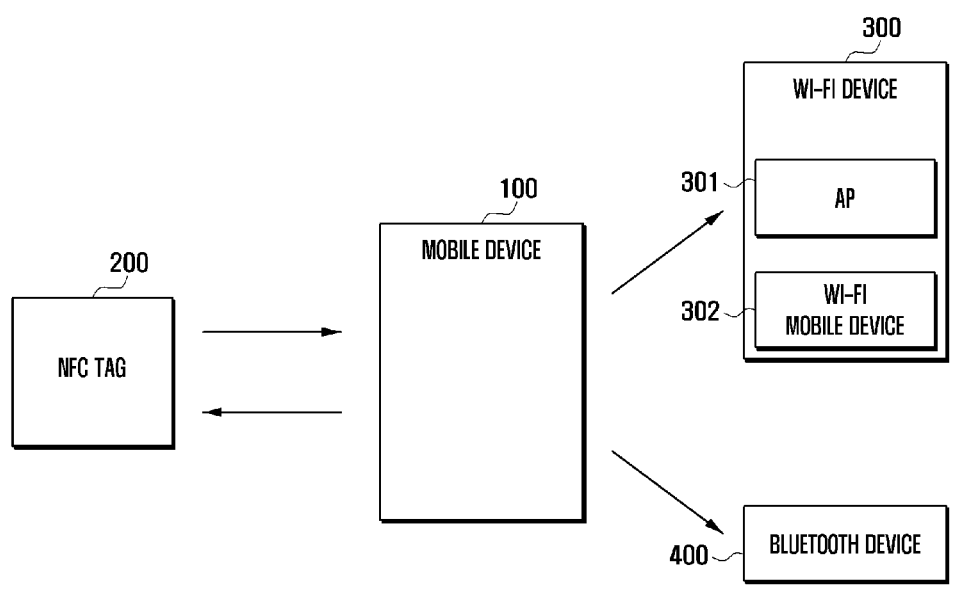
FIG. 4 is a block diagram illustrating a system for offering a specific service in which a mobile device is connected to a selected Wi-Fi device or Bluetooth device through an NFC tag in accordance with an exemplary embodiment of the present invention.

FIG. 4 is a block diagram illustrating a system for offering a specific service in which a mobile device is connected to a selected Wi-Fi device or Bluetooth device through an NFC tag in accordance with an exemplary embodiment of the present invention.

Referring to FIG. 4, the system includes the mobile device 100, the NFC tag 200, a Wi-Fi device 300, and a Bluetooth device 400. According to an exemplary implementation, the system of FIG. 4 may include both or one of the Wi-Fi device 300 and the Bluetooth device 400.

The mobile device 100 and the NFC tag 200 in this system correspond to those shown in FIG. 2, respectively, and a description of the same will be avoided hereinafter.

The Wi-Fi device 300 may be composed of an AP 301 and a Wi-Fi mobile device 302.

The AP 301 corresponds to a base station that supports a wireless access and network connection of the mobile device 100. The AP 301 is connected to a service provider server through a gateway and allows a wireless communication between the mobile device 100 and a service provider server.

The Wi-Fi mobile device 302 has a Wi-Fi module and performs a Wi-Fi based communication with the mobile device 100. The Wi-Fi mobile device 302 is connected to the mobile device 100 through the Wi-Fi Direct. Namely, the mobile device 100 and the Wi-Fi mobile device 302 perform their respective search processes, select the Group Owner, and then perform a Peer-To-Peer (P2P) communication.

The Bluetooth device 400 has a Bluetooth module and performs Bluetooth communication with the mobile device 100. Using a BD_ADDR and a PIN code, the mobile device 100 performs a connection with the Bluetooth device 400.

In the system of FIG. 4, the mobile device 100 inputs Bluetooth device connection information, such as a BD_ADDR and a PIN code, or Wi-Fi device connection information, such as an SSID, a security type, and a password, into the NFC tag 200. Thereafter, when detecting proximity to or contact with the NFC tag 200, the mobile device 100 performs a connection with the Wi-Fi device 300 or the Bluetooth device 400 according to the Bluetooth device connection information or the Wi-Fi device connection information stored in the NFC tag 200.

Figure 5:
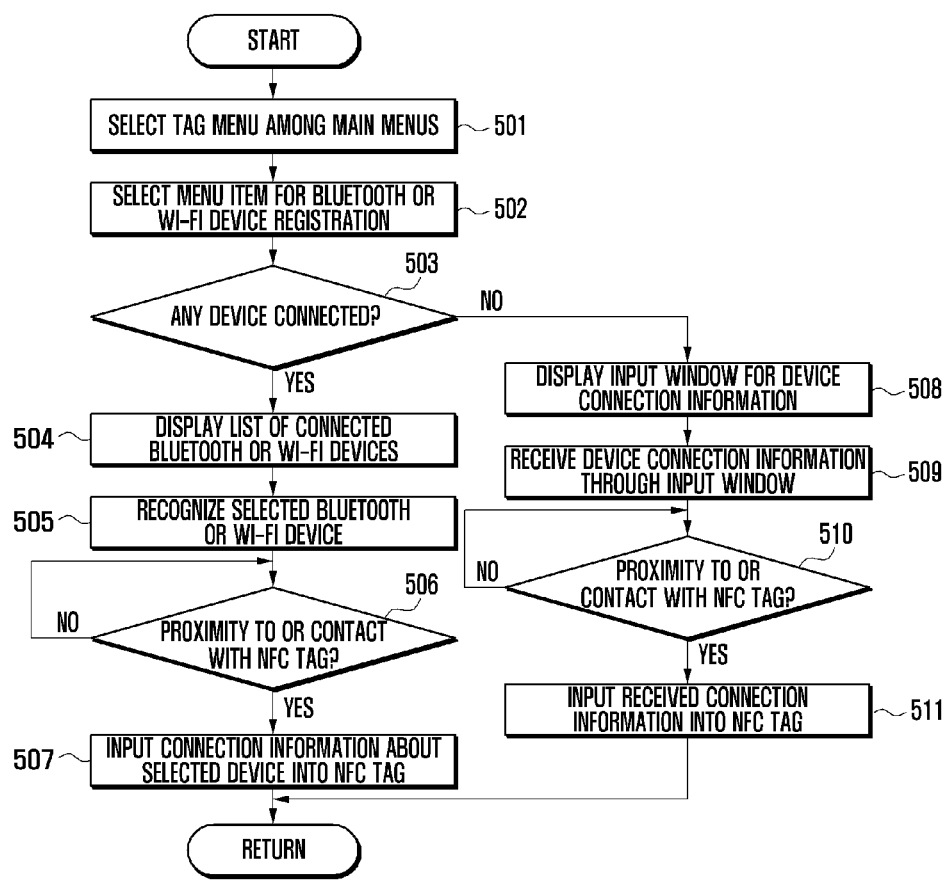
FIG. 5 is a flow diagram illustrating a process of step 301 shown in FIG. 3 in connection with FIG. 4 in accordance with an exemplary embodiment of the present invention.

FIG. 5 is a flow diagram illustrating a process of step 301 shown in FIG. 3 in connection with FIG. 4 according to an exemplary embodiment of the present invention.

Referring to FIG. 5, the information inputting unit 171 recognizes that a tag menu is selected among main menus through the input unit 150 in step 501. In exemplary embodiments of this invention, the main menus of the mobile device 100 contain the tag menu that corresponds to an application for reading a short-range communication tag (e.g., the NFC tag) or for inputting information into the short-range communication tag.

Figure 15:
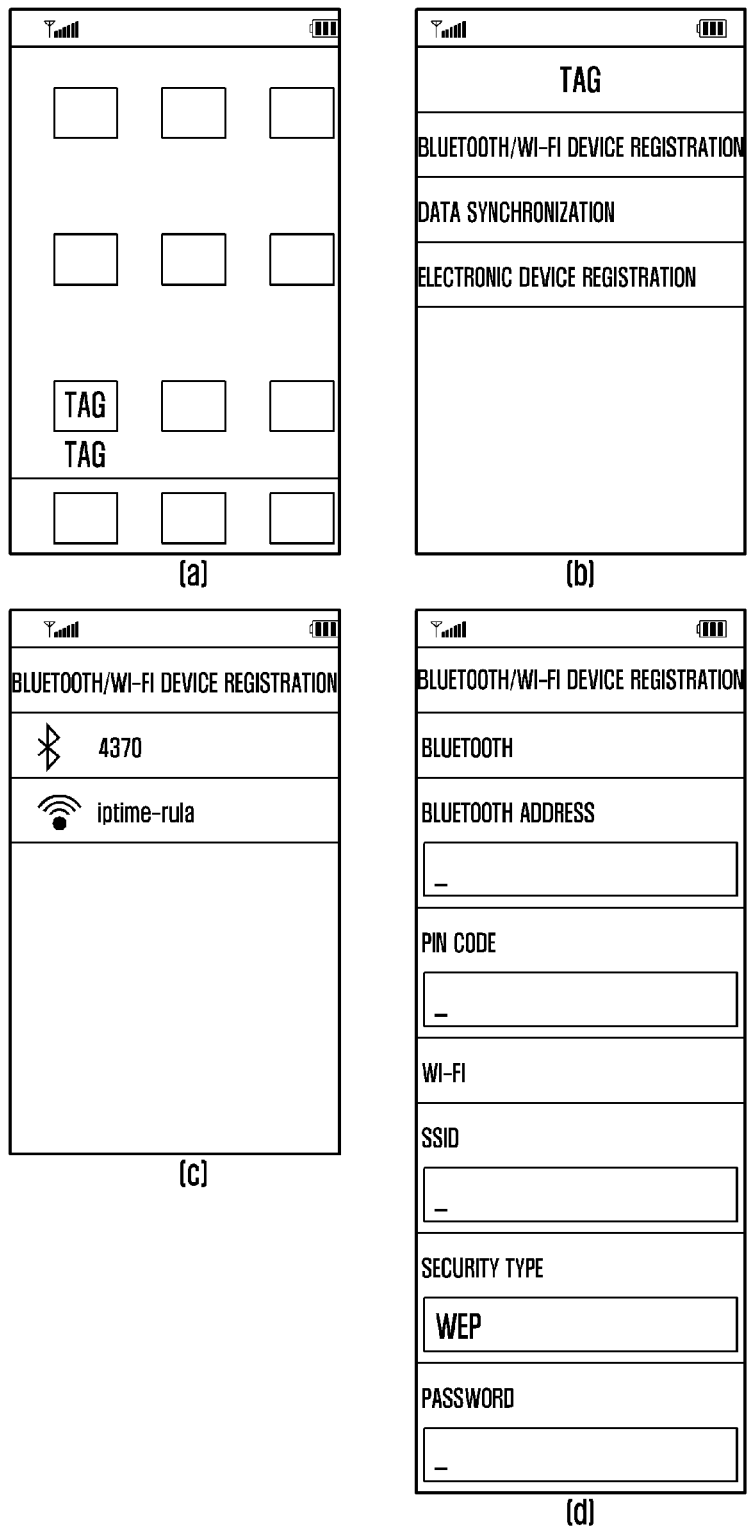
FIG. 15 shows screenshots of a display screen in connection with FIG. 4 in accordance with an exemplary embodiment of the present invention.

FIG. 15 shows screenshots of a display screen in connection with FIG. 5 according to an exemplary embodiment of the present invention.

Referring to FIG. 15, frame [a] shows a home screen in which a plurality of main menu icons are arranged and the tag menu is assigned to one of them.

Referring again to FIG. 5, after recognizing a selection of the tag menu through the input unit 150, in step 502, the information inputting unit 171 recognizes that a menu item for the registration of a Bluetooth or Wi-Fi device is selected in the tag menu through the input unit 150. More specifically, when the tag menu is selected, the information inputting unit 171 may control the display unit 160 to display menu items in the tag menu. As shown in frame [b] of FIG. 15, the menu items in the tag menu may include a menu item for Bluetooth or Wi-Fi device registration, a menu item for data synchronization, and a menu item for electronic device registration. The menu item for Bluetooth or Wi-Fi device registration is used to input, into the NFC tag 200, connection information about a Bluetooth or Wi-Fi device to be automatically connected by the mobile device 100. The exemplary embodiment shown in FIG. 5 is based on the assumption that a user selects the menu item for Bluetooth or Wi-Fi device registration among menu items of the tag menu.

After the menu item for Bluetooth or Wi-Fi device registration is selected, in step 503, the information inputting unit 171 determines whether any Bluetooth or Wi-Fi device is currently connected through a Bluetooth module (not shown) or the Wi-Fi module 132.

If it is determined in step 503 that there is a connected Bluetooth or Wi-Fi device, in step 504, the information inputting unit 171 controls the display unit 160 to display a list of the connected Bluetooth or Wi-Fi devices. Here, under the control of the information inputting unit 171, the display unit 160 may display a Bluetooth name, a Bluetooth address, etc. of the Bluetooth device or an SSID, a security type, etc. of the Wi-Fi device.

Frame [c] of FIG. 15 shows a list of Bluetooth or Wi-Fi devices currently connected. In frame [c] of FIG. 15, '4370' corresponds to a Bluetooth name and 'iptime-rula' corresponds to an SSID.

In the list of currently connected Bluetooth or Wi-Fi devices, a user may select a desired device to be automatically connected. After a user's selection, in step 505, the information inputting unit 171 recognizes the selected device through the input unit 150.

In step 506, the information inputting unit 171 controls the NFC module 131 to determine whether proximity to or contact with the NFC tag 200 is detected. More specifically, a user brings the mobile device 100 in proximity to or contact with the NFC tag 200 so as to input device connection information into the NFC tag 200. Alternatively, a user may bring the NFC tag 200 in proximity to or contact with the mobile device 100. Thereafter, when the NFC tag 200 is approaching within a given distance from the mobile device 100 or touched with the mobile device 100, the NFC module 131 detects proximity to or contact with the NFC tag 200, and thereby the information inputting unit 171 recognizes proximity to or contact with the NFC tag 200.

In step 507, the information inputting unit 171 controls the NFC module 131 and thereby inputs connection information about the selected device into the NFC tag 200. Therefore, the NFC tag 200 stores connection information about a Bluetooth or Wi-Fi device to be connected. In addition, a user may attach the NFC tag 200 to a desired place or device. For instance, if a user wants a Bluetooth or Wi-Fi connection with a selected device at a desired place, he or she may attach the NFC tag 200 to that place. Also, a user may attach the NFC tag 200 directly to a specific device selected for a Bluetooth or Wi-Fi connection.

In contrast, if it is determined in step 503 that the mobile device 100 is not currently connected to any Bluetooth or Wi-Fi device, in step 508, the information inputting unit 171 controls the display unit 160 to display an input window for receiving Bluetooth or Wi-Fi device connection information. In this step, the display unit 160 may display both or one of the input windows for Bluetooth device connection information and the input window for Wi-Fi device connection information. As shown in a frame [d] of FIG. 15, the input window for Bluetooth device connection information may contain a Bluetooth address input window and a PIN code input window, and the input window for Wi-Fi device connection information may contain an SSID input window, a security type input window, and a password input window.

In step 509, the information inputting unit 171 receives connection information from the input unit 150. Namely, if a user desires a connection of any Bluetooth or Wi-Fi device, he or she enters device connection information into the input window on the display unit 160 through the input unit 150.

Thereafter, in step 510, the information inputting unit 171 determines whether proximity to or contact with the NFC tag 200 is detected. More specifically, when the NFC tag 200 is approaching within a given distance from the mobile device 100 or touched with the mobile device 100, the NFC module 131 detects proximity to or contact with the NFC tag 200, and thereby the information inputting unit 171 recognizes proximity to or contact with the NFC tag 200.

In step 511, the information inputting unit 171 controls the NFC module 131 and thereby inputs the received device connection information into the NFC tag 200. Therefore, the NFC tag 200 comes to store connection information about a Bluetooth or Wi-Fi device to be connected. In addition, a user may attach the NFC tag 200 to a desired place or device.

Thereafter, as discussed above, the control unit 170 recognizes proximity to or contact with the NFC tag 200 through the NFC module 131 in step 302 of FIG. 3, and, in step 303, the information reading unit 172 reads Bluetooth device connection information or Wi-Fi device connection information from the NFC tag 200. In step 304, the function performing unit 173 performs a connection with the Bluetooth or Wi-Fi device according to the read connection information. In this step, the function performing unit 173 searches for the Bluetooth device according to Bluetooth address information and performs a connection procedure according to PIN code information. Also, the function performing unit 173 searches for the Wi-Fi device according to SSID information and performs a connection procedure according to security type information and password information.

In an exemplary embodiment as shown in FIGS. 4 and 5, a user can easily obtain an automatic connection with a desired Wi-Fi or Bluetooth device by only bringing the mobile device 100 in proximity to or contact with the NFC tag 200.

Figure 6:
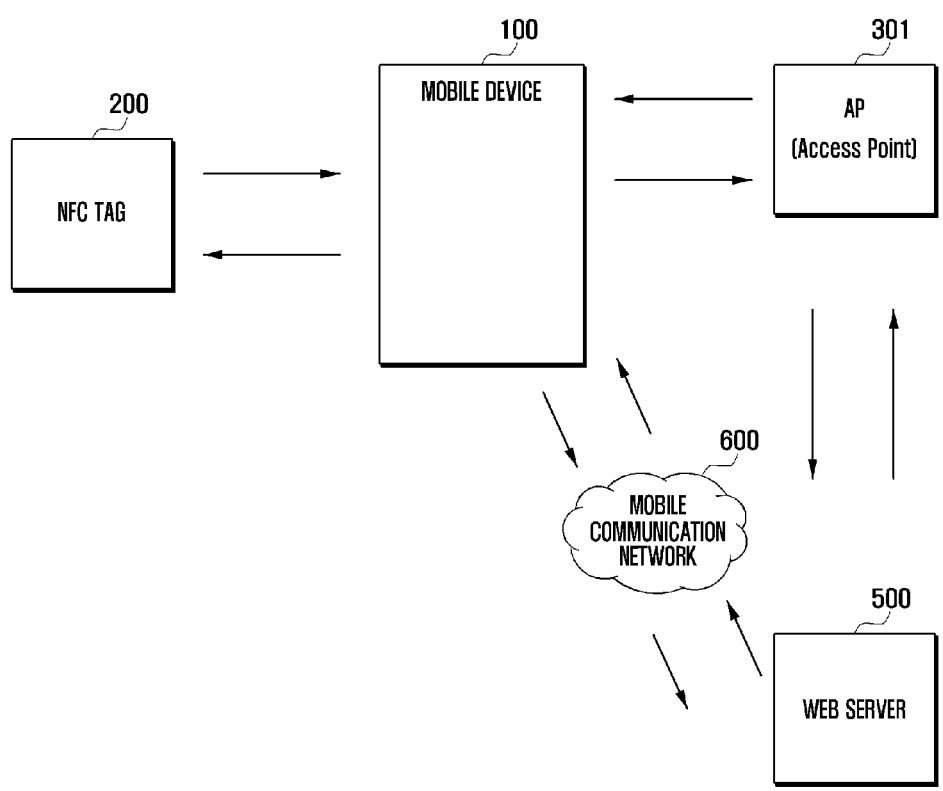
FIG. 6 is a block diagram illustrating a system for offering a specific service in which a mobile device accesses a selected web server through an NFC tag in accordance with an exemplary embodiment of the present invention.

FIG. 6 is a block diagram illustrating a system for offering a specific service in which a mobile device accesses a selected web server through an NFC tag in accordance with an exemplary embodiment of the present invention.

Referring to FIG. 6, the system includes the mobile device 100, the NFC tag 200, the AP 301, a web server 500, and a mobile communication network 600. In other exemplary embodiments of this invention, one of the AP 301 and the mobile communication network 600 may be omitted from the system of FIG. 6.

The mobile device 100 and the NFC tag 200 in this system correspond to those shown in FIG. 2, respectively, and a description of the same will be avoided hereinafter. In addition, the AP 301 corresponds to that shown in FIG. 4, and a description of the same will be avoided hereinafter.

The web server 500 offers a data transmission/reception service to the mobile device 100. When the mobile device 100 accesses the web server 500 and requests data, the web server 500 sends requested data to the mobile device 100.

The mobile communication network 600 is operated by a mobile communication system and supports wireless communication between the mobile device 100 and the web server 500. A wireless interface available for the mobile communication network 600 may be Time Division Multiple Access (TDMA), Frequency Division Multiple Access (FDMA), Code Division Multiple Access (CDMA), Universal Mobile Telecommunications System (UMTS), Global System for Mobile Communication (GSM), or the like. In case of being based on a CDMA interface, the mobile communication network 600 may include a plurality of Base Station Controllers (BSCs) and a Mobile Switching Center (MSC).

In the system shown in FIG. 6, the mobile device 100 inputs identification information about an application to be executed and a web address of a web server to be accessed into the NFC tag 200. In another exemplary embodiment, the mobile device 100 may further input connection information about the AP 301 to be connected into the NFC tag 200. Thereafter, when recognizing proximity to or contact with the NFC tag 200, the mobile device 100 may execute a selected application according to application identification information stored in the NFC tag 200, access a selected web server according to a web address stored in the NFC tag 200, and synchronize data related to the executed application. In still another exemplary embodiment, the mobile device 100 may perform a connection with the AP 301 according to AP connection information stored in the NFC tag 200, execute a selected application, and assess a selected web server, and synchronize data related to the executed application.

Figure 7:
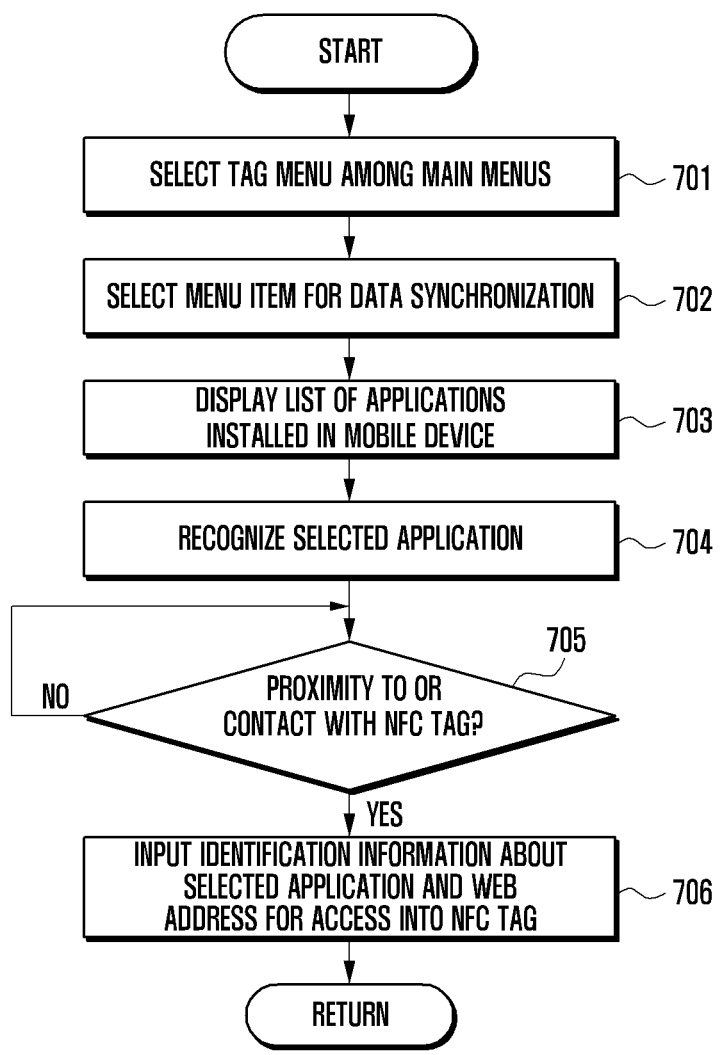
FIG. 7 is a flow diagram illustrating a process of step 301 shown in FIG. 3 in connection with FIG. 6 in accordance with an exemplary embodiment of the present invention.

FIG. 7 is a flow diagram illustrating a process of step 301 shown in FIG. 3 in connection with FIG. 6 according to an exemplary embodiment of the present invention.

Referring to FIG. 7, the information inputting unit 171 recognizes that a tag menu is selected among main menus through the input unit 150 in step 701. In step 702, the information inputting unit 171 recognizes that a menu item for data synchronization is selected in the tag menu through the input unit 150. More specifically, after the tag menu is selected, the information inputting unit 171 may control the display unit 160 to display menu items in the tag menu. As discussed above, the menu items in the tag menu may include a menu item for Bluetooth or Wi-Fi device registration, a menu item for data synchronization, and a menu item for electronic device registration. The menu item for data synchronization is to input application identification information and a web server address so as to automatically update data in connection with a selected application. The exemplary embodiment shown in FIG. 7 is based on the assumption that a user selects the menu item for data synchronization among menu items of the tag menu.

After the menu item for data synchronization is selected, in step 703, the information inputting unit 171 controls the display unit 160 to display a list of applications installed in the mobile device 100. In step 704, the information inputting unit 171 recognizes an application selected by a user through the input unit 150. Namely, when a user selects a desired application for data synchronization, the information inputting unit 171 recognizes the selected application through the input unit 150. In this step, a user may select one or more applications.

In step 705, the information inputting unit 171 controls the NFC module 131 to determine whether proximity to or contact with the NFC tag 200 is detected. More specifically, a user brings the mobile device 100 in proximity to or contact with the NFC tag 200 so as to input device connection information into the NFC tag 200. Alternatively, a user may bring the NFC tag 200 in proximity to or contact with the mobile device 100. Thereafter, when the NFC tag 200 is approaching within a given distance from the mobile device 100 or touched with the mobile device 100, the NFC module 131 detects proximity to or contact with the NFC tag 200, and thereby the information inputting unit 171 recognizes proximity to or contact with the NFC tag 200.

In step 706, the information inputting unit 171 controls the NFC module 131 and thereby inputs identification information about an application selected by a user and a web address to be accessed in connection with the application into the NFC tag 200. Thereafter, a user attaches the NFC tag 200 to a desired place or device. The web address may be stored in the form of a URL indicating the location of a web file.

Figure 8:
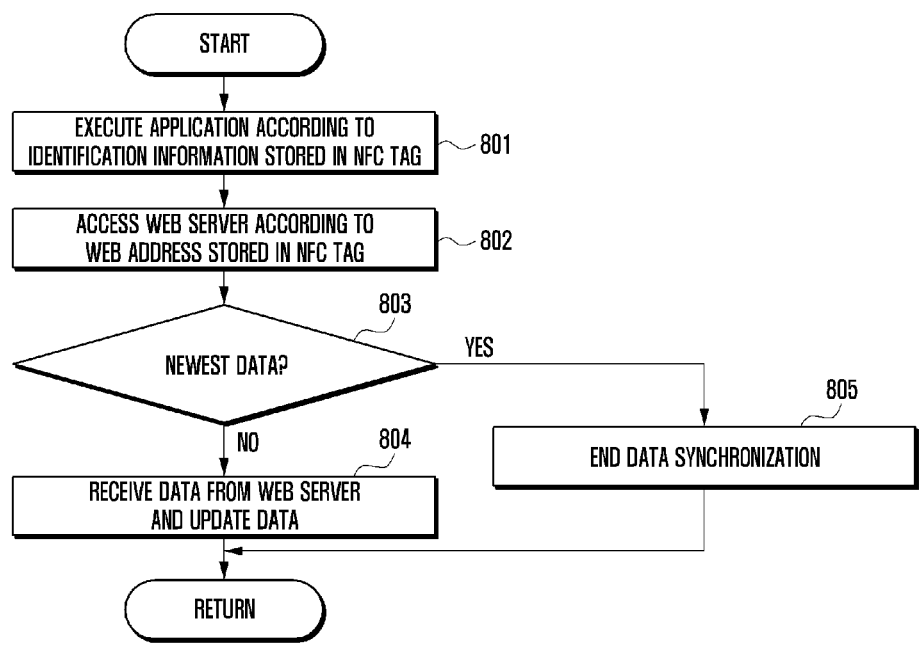
FIG. 8 is a flow diagram illustrating a process of step 304 shown in FIG. 3 in connection with FIG. 6 in accordance with an exemplary embodiment of the present invention.

FIG. 8 is a flow diagram illustrating a process of step 304 shown in FIG. 3 in connection with FIG. 6 according to an exemplary embodiment of the present invention. A process shown in FIG. 8 is correlated with a process shown in FIG. 7.

Referring to FIGS. 3, 7 and 8, the control unit 170 recognizes proximity to or contact with the NFC tag 200 through the NFC module 131 in step 302 of FIG. 3, and, in step 303, the information reading unit 172 reads application identification information and web address information from the NFC tag 200.

In step 801, the function performing unit 173 executes a specific application according to the application identification information stored in the NFC tag 200 and, in step 802, accesses the web server 500 according to the web address stored in the NFC tag 200. Namely, the function performing unit 173 may access the web server 500 through the mobile communication network 600 by controlling the mobile communication unit 110, or access the web server 500 through the AP 301 after accessing the AP 301 by controlling the Wi-Fi module 132.

In step 803, the function performing unit 173 determines whether data stored in the mobile device 100 is identical to data registered in the web server 500. Namely, step 803 is to determine whether data is the newest in connection with the executed application. If data stored in the mobile device 100 is not identical to data registered in the web server 500, namely if data stored in the mobile device 100 is not the newest, in step 804, the function performing unit 173 controls the mobile communication unit 110 or the Wi-Fi module 132 and thereby receives data from the web server 500 to update data. If data stored in the mobile device 100 is identical to data registered in the web server 500, namely if data stored in the mobile device 100 is the newest, in step 805, the function performing unit 173 ends a data synchronization process.

Figure 9:
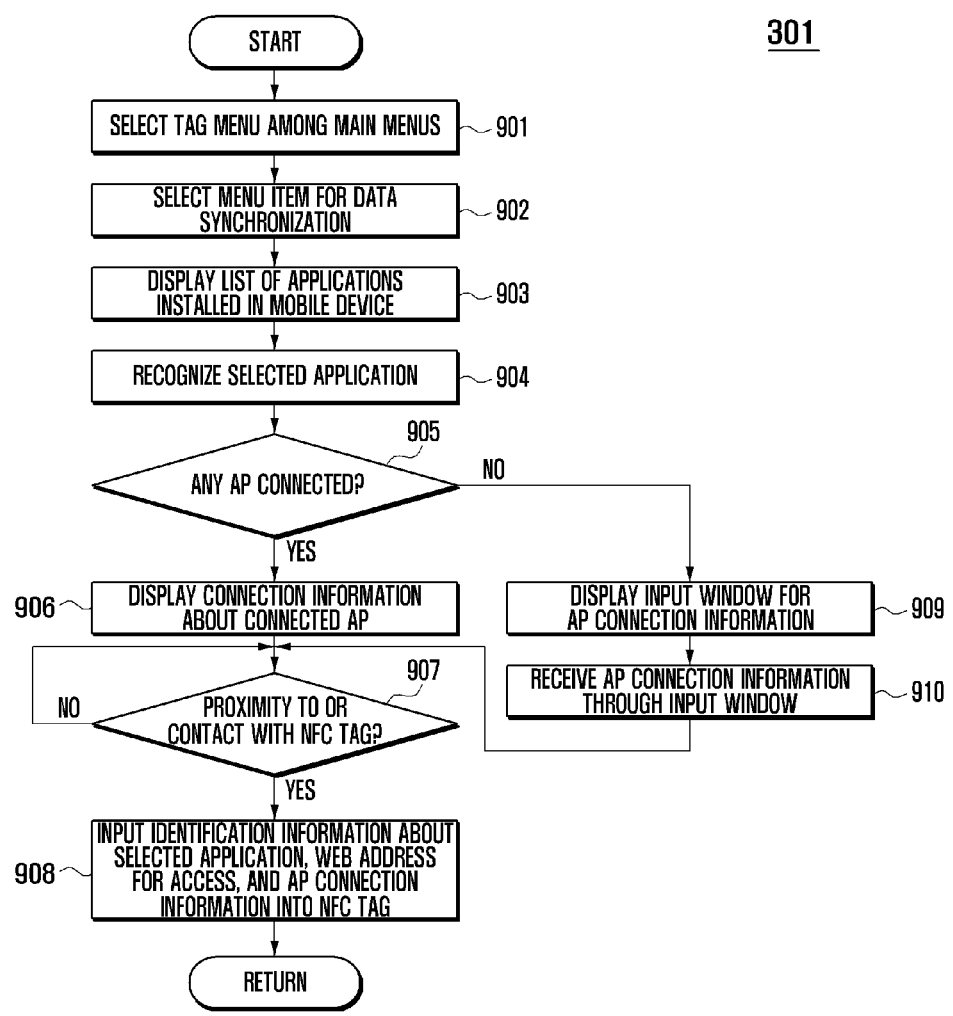
FIG. 9 is a flow diagram illustrating another process of step 301 shown in FIG. 3 in connection with FIG. 6 in accordance with an exemplary embodiment of the present invention.

FIG. 9 is a flow diagram illustrating another process of step 301 shown in FIG. 3 in connection with FIG. 6 according to an exemplary embodiment of the present invention.

Referring to FIG. 9, steps 901 to 904 correspond to the aforesaid steps 701 to 704, respectively, and a description of the same will be avoided hereinafter.

After recognizing a user's selection of any application through the input unit 150, in step 905, the information inputting unit 171 controls the Wi-Fi module 132 and thereby determines whether any AP is currently connected. If the AP is connected, in step 906, the information inputting unit 171 controls the display unit 160 to display connection information about the AP currently connected. In step 907, the information inputting unit 171 controls the NFC module 131 to determine whether proximity to or contact with the NFC tag 200 is detected. When the NFC tag 200 is approaching within a given distance from the mobile device 100 or touched with the mobile device 100, the NFC module 131 detects proximity to or contact with the NFC tag 200, and thereby the information inputting unit 171 recognizes proximity to or contact with the NFC tag 200.

In step 908, the information inputting unit 171 controls the NFC module 131 and thereby inputs identification information about an application selected by a user, a web address to be accessed in connection with the application, and connection information of the AP, into the NFC tag 200. Thereafter, a user attaches the NFC tag 200 to a desired place or device.

If it is determined that no AP is connected in step 905, in step 909, the information inputting unit 171 controls the display unit 160 to display an input window for AP connection information and, in step 910, receives AP connection information from a user through the input unit 150. And, the information inputting unit 171 performs the above-discussed steps 907 and 908.

Figure 10:
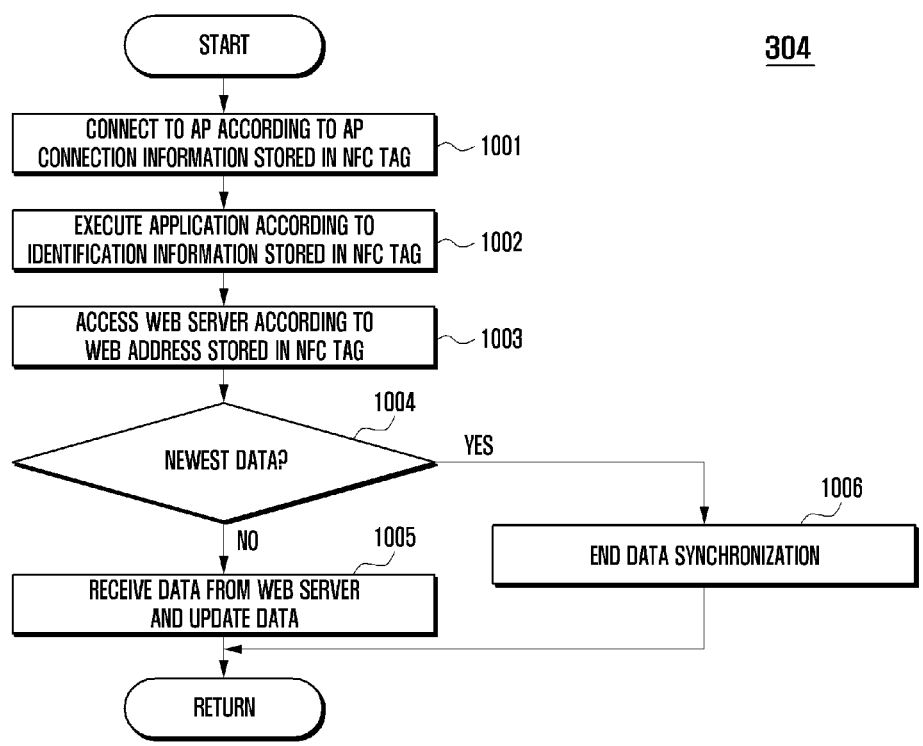
FIG. 10 is a flow diagram illustrating another process of step 304 shown in FIG. 3 in connection with FIG. 6 in accordance with an exemplary embodiment of the present invention.

FIG. 10 is a flow diagram illustrating another process of step 304 shown in FIG. 3 in connection with FIG. 6 according to an exemplary embodiment of the present invention. A process shown in FIG. 10 is correlated with a process shown in FIG. 9.

Referring to FIGS. 3, 9 and 10, the control unit 170 recognizes proximity to or contact with the NFC tag 200 through the NFC module 131 in step 302 of FIG. 3, and, in step 303, the information reading unit 172 reads application identification information, web address information and AP connection information from the NFC tag 200.

In step 1001, the function performing unit 173 controls the Wi-Fi module 132 and thereby performs a connection with the AP 301 according to the AP connection information stored in the NFC tag 200. In step 1002, the function performing unit 173 executes a specific application according to the application identification information stored in the NFC tag 200 and, in step 1003, accesses the web server 500 according to the web address stored in the NFC tag 200. Namely, the function performing unit 173 accesses the web server 500 through the AP 301 by controlling the Wi-Fi module 132.

In step 1004, the function performing unit 173 determines whether data stored in the mobile device 100 is identical to data registered in the web server 500. If data stored in the mobile device 100 is not identical to data registered in the web server 500, in step 1005, the function performing unit 173 controls the Wi-Fi module 132 and thereby receives data from the web server 500 to update data. If data stored in the mobile device 100 is identical to data registered in the web server 500, in step 1006, the function performing unit 173 ends a data synchronization process.

For instance, if a specific application 'today's food menu' is installed in the mobile device 110, the NFC tag 200 may store application identification information and a URL indicating update data location and also may be attached to the front of a restaurant. A user can obtain information about today's food menu by only bringing the mobile device 100 in proximity to or contact with the NFC tag 200.

Figure 11:
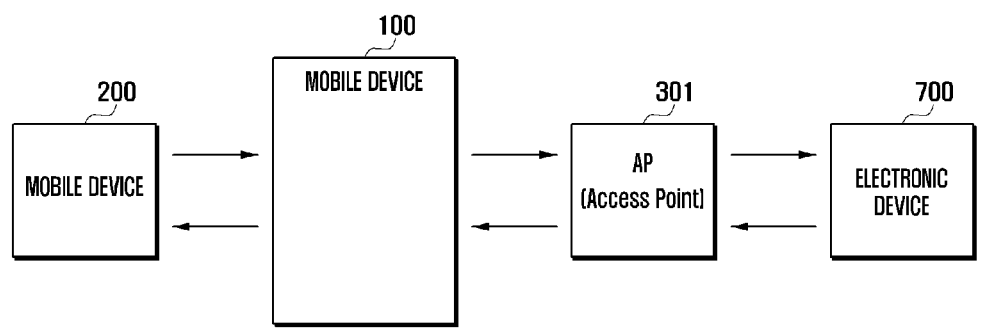
FIG. 11 is a block diagram illustrating a system for offering a specific service in which a mobile device transmits data to a selected electronic device through an NFC tag in accordance with an exemplary embodiment of the present invention.

FIG. 11 is a block diagram illustrating a system for offering a specific service in which a mobile device transmits data to a selected electronic device through an NFC tag in accordance with an exemplary embodiment of the present invention.

Referring to FIG. 11, the system includes the mobile device 100, the NFC tag 200, the AP 301, and an electronic device 700.

The mobile device 100 and the NFC tag 200 in this system correspond to those shown in FIG. 2, respectively, and a description of the same will be avoided hereinafter. In addition, the AP 301 corresponds to that shown in FIG. 4, and a description of the same will be avoided hereinafter.

The electronic device 700 has a Wi-Fi module and outputs or stores data. In some exemplary embodiments of this invention, the electronic device 700 may be a Digital Living Network Alliance (DLNA) certified device such as a printer, a TV, a projector, or the like. The electronic device 700 is connected to the mobile device 100 through the AP 301 and may output contents received from the mobile device 100.

In the system shown in FIG. 11, the mobile device 100 inputs identification information about the electronic device 700 to output contents and connection information about the AP 301 into the NFC tag 200. Thereafter, when recognizing proximity to or contact with the NFC tag 200, the mobile device 100 performs a connection with the AP 301 according to AP connection information stored in the NFC tag 200, and searches for the electronic device 700 according to electronic device identification information stored in the NFC tag 200. The mobile device 100 sends contents, being currently executed, to the electronic device 700. And the electronic device 700 executes contents received from the mobile device 100.

Figure 12:
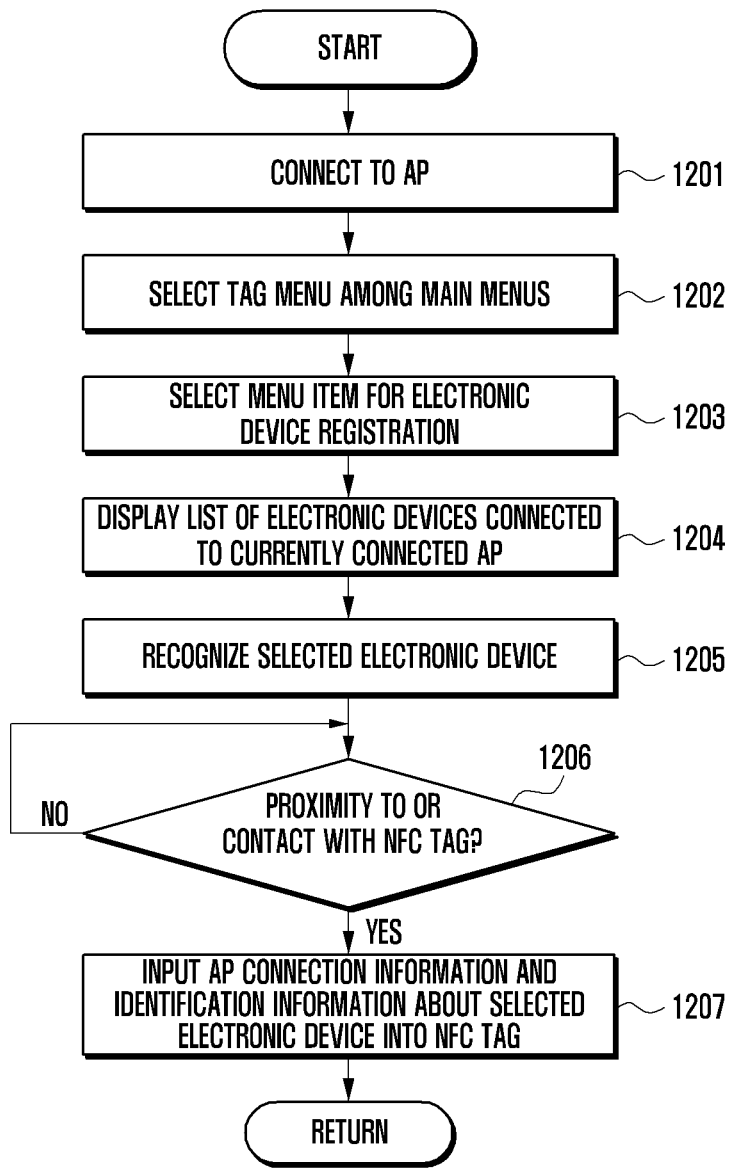
FIG. 12 is a flow diagram illustrating a process of step 301 shown in FIG. 3 in connection with FIG. 11 in accordance with an exemplary embodiment of the present invention.

FIG. 12 is a flow diagram illustrating a process of step 301 shown in FIG. 3 in connection with FIG. 11 according to an exemplary embodiment of the present invention.

Referring to FIG. 12, the control unit 170 controls the Wi-Fi module 132 and thereby performs a connection with the AP 301 in step 1201. An information inputting process shown in FIG. 12 is performed in a state where the mobile device 100 is connected to the AP 301.

In step 1202, the information inputting unit 171 recognizes that a tag menu is selected among main menus through the input unit 150. In step 1203, the information inputting unit 171 recognizes that a menu item for the registration of an electronic device is selected in the tag menu through the input unit 150. More specifically, after the tag menu is selected, the information inputting unit 171 may control the display unit 160 to display menu items in the tag menu. As discussed above, the menu items in the tag menu may include a menu item for Bluetooth or Wi-Fi device registration, a menu item for data synchronization, and a menu item for electronic device registration. The menu item for electronic device registration is to input, into the NFC tag 200, identification information about an electronic device that will output content being executed in the mobile device 100. This exemplary embodiment shown in FIG. 12 is based on the assumption that a user selects the menu item for electronic device registration among menu items of the tag menu.

After the menu item for electronic device registration is selected, in step 1204, the information inputting unit 171 controls the display unit 160 to display a list of electronic devices connected to the current AP 301. In this step, the information inputting unit 171 may control the display unit 160 to first display a list of currently connected APs and, when one of the APs is selected, to display a list of electronic devices connected to the selected AP.

Figure 16:
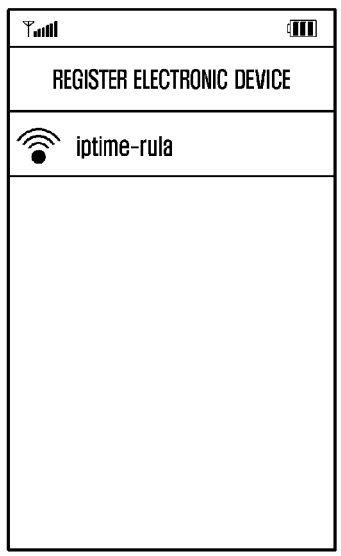
FIG. 16 shows screenshots of a display screen in connection with FIG. 11 in accordance with an exemplary embodiment of the present invention.
Figure 16:
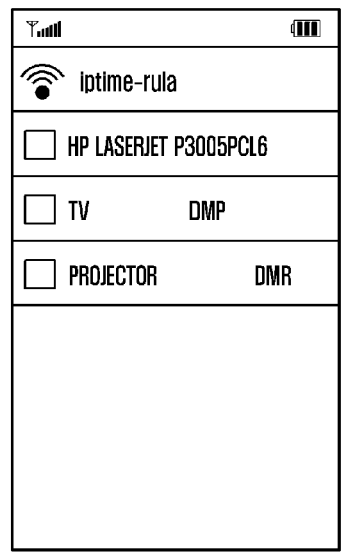

FIG. 16 shows screenshots of a display screen in connection with FIG. 11 according to an exemplary embodiment of the present invention.

Referring to FIG. 16, frame [a] shows a list of APs currently connected to the mobile device 100. In frame [a], 'iptime-rula' corresponds to the SSID of the currently connected AP 301. Additionally, frame [b] of FIG. 16 shows a list of electronic devices connected to the AP 301. 'HP LaserJet P3005 PCL 6' corresponds to a printer name, and 'TV' and 'projector' correspond to DLNA device names. 'Digital Media Player' (DMP) and 'Digital Media Renderer' (DMR) correspond to DLNA device types.

In step 1205, the information inputting unit 171 recognizes an electronic device selected through the input unit 150. In step 1206, the information inputting unit 171 controls the NFC module 131 to determine whether proximity to or contact with the NFC tag 200 is detected. When recognizing proximity to or contact with the NFC tag 200, in step 1207, the information inputting unit 171 inputs connection information about the AP 301 and identification information about the selected electronic device into the NFC tag 200.

The SSID, security type, and password are input as the connection information about the AP 301. If the selected electronic device is a normal device such as a printer, a name of the electronic device is input. If the selected electronic device is a DLNA device, a DLNA device name and a device type such as DMP, DMR, Digital Media Server (DMS) and Digital Media Controller (DMC) are input. A user may attach the NFC tag 200 to the electronic device to output contents.

Figure 13:
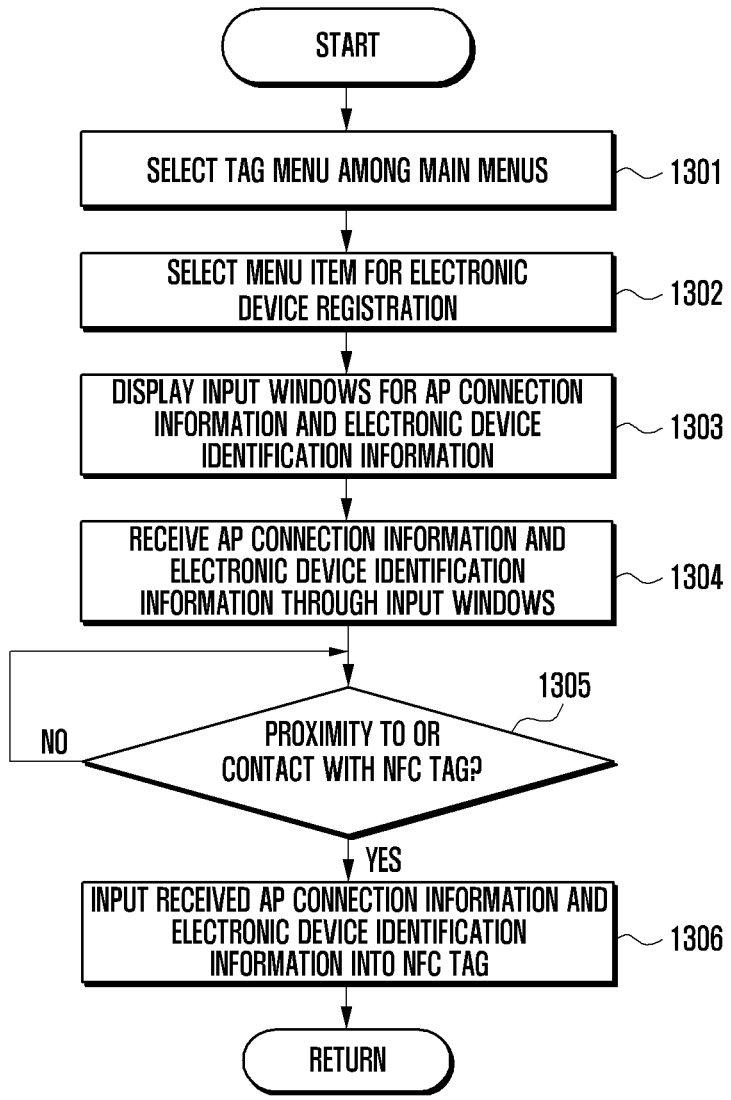
FIG. 13 is a flow diagram illustrating another process of step 301 shown in FIG. 3 in connection with FIG. 11 in accordance with an exemplary embodiment of the present invention.

FIG. 13 is a flow diagram illustrating another process of step 301 shown in FIG. 3 in connection with FIG. 11 according to an exemplary embodiment of the present invention.

Referring to FIG. 13, the information inputting unit 171 recognizes that a tag menu is selected among main menus through the input unit 150 in step 1301. In step 1302, the information inputting unit 171 recognizes that a menu item for the registration of an electronic device is selected in the tag menu through the input unit 150. And, in step 1303, the information inputting unit 171 controls the display unit 160 to display input windows for receiving AP connection information and electronic device identification information.

Frame [c] of FIG. 16 shows input windows for AP connection information and electronic device identification information. More specifically, frame [c] of FIG. 16 shows an SSID input window, a security type input window, and a password input window in connection with AP connection information, and also shows a device name input window and a device type input window in connection with electronic device identification information. A user may enter, into the input windows shown in frame [c] of FIG. 16, connection information about a desired AP and identification information about an electronic device to output contents.

In step 1304, the information inputting unit 171 receives AP connection information and electronic device identification information through the input unit 150 and, in step 1305, determines whether proximity to or contact with the NFC tag 200 is detected through the NFC module 131. If proximity to or contact with the NFC tag 200 is detected, in step 1306, the information inputting unit 171 inputs the received AP connection information and electronic device identification into the NFC tag 200. A user may attach the NFC tag 200 to the electronic device to output contents.

Figure 14:
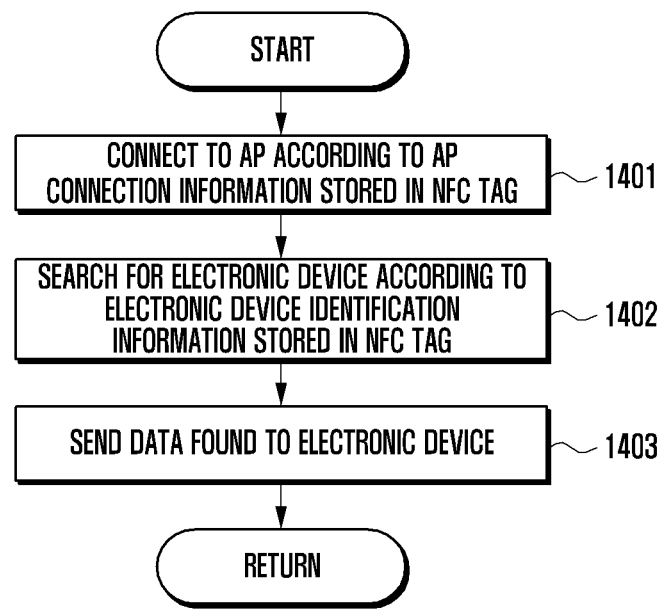
FIG. 14 is a flow diagram illustrating a process of step 304 shown in FIG. 3 in connection with FIG. 11 in accordance with an exemplary embodiment of the present invention.

FIG. 14 is a flow diagram illustrating a process of step 304 shown in FIG. 3 in connection with FIG. 11 according to an exemplary embodiment of the present invention. A process shown in FIG. 14 is correlated with processes shown in FIGS. 12 and 13.

Referring to FIGS. 3, 12, 13, and 14, after the information inputting unit 171 inputs AP connection information and electronic device identification information into the NFC tag 200 in step 301 of FIG. 3, the control unit 170 executes content selected according to a user's input. Here, executed content may be photo, music, video, or the like. When the control unit 170 recognizes proximity to or contact with the NFC tag 200 through the NFC module 131 in step 302 of FIG. 3, the information reading unit 172 reads AP connection information and electronic device identification information from the NFC tag 200 in step 303.

In step 1401, the function performing unit 173 controls the Wi-Fi module 132 to be connected to the AP according to AP connection information stored in the NFC tag 200. In step 1402, the function performing unit 173 searches the electronic device according to electronic device identification information stored in the NFC tag 200. If any electronic device corresponding to the read identification information is found, the function performing unit 173 controls the Wi-Fi module 132 to send data to the found electronic device in step 1403. Here, the function performing unit 173 sends currently running contents, together with content data containing content execution commands, to the found electronic device. The electronic device receives and plays contents.

If electronic device identification information stored in the NFC tag 200 corresponds to a printer name, the function performing unit 173 converts the current content into a print format and sends it to the printer.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a function of a mobile device by using a short-range communication, the method comprising:
inputting function-related information into a short-range communication tag;
recognizing proximity to or contact with the short-range communication tag;
reading the function-related information from the short-range communication tag; and
performing a function correlated with the function-related information,
wherein the inputting of the function-related information includes:
recognizing that a menu item for the registration of a short-range communication device is selected in a tag menu;
determining whether the mobile device is currently connected to any short-range communication device;
when there is any short-range communication device currently connected, displaying a list of the connected short-range communication devices;
recognizing that at least one of the short-range communication devices is selected in the list; and
when recognizing the proximity to or contact with the short-range communication tag, inputting connection information about the selected short-range communication device into the short-range communication tag.

2. The method of claim 1, wherein the inputting of the function-related information further includes:
when there is no short-range communication device currently connected, displaying an input window;
receiving connection information about a short-range communication device through the input window; and
when recognizing the proximity to or contact with the short-range communication tag, inputting the received connection information about the short-range communication device into the short-range communication tag.

3. The method of claim 2, wherein the connection information about the short-range communication device includes:
a Bluetooth address and a Personal Identity Number (PIN) code if the short-range communication device is a Bluetooth device; and
a Service Set IDentifier (SSID), a security type, and a password if the short-range communication device is a Wi-Fi device.

4. The method of claim 2, wherein the reading of the function-related information includes reading the connection information about the short-range communication device from the short-range communication tag, and
wherein the performing of the function includes performing a connection with the short-range communication device according to the connection information.

5. The method of claim 1, wherein the inputting of the function-related information further includes:
recognizing that a menu item for data synchronization is selected in a tag menu;
displaying a list of applications installed in the mobile device;
recognizing that at least one of the applications is selected in the list; and
when recognizing proximity to or contact with the short-range communication tag, inputting identification information about the selected application and a web address to be accessed into the short-range communication tag.

6. The method of claim 5, wherein the reading of the function-related information includes reading the application identification information and the web address from the short-range communication tag, and
wherein the performing of the function includes:
executing the application according to the application identification information;
accessing a web server according to the web address;
determining whether application-related data stored in the mobile device is identical to application-related data registered in the web server;
when both data are not identical to each other, receiving the application-related data from the web server to update the data; and
when both data are identical to each other, ending a data synchronization process.

7. The method of claim 1, wherein the inputting of the function-related information further includes:
recognizing that a menu item for data synchronization is selected in a tag menu;
displaying a list of applications installed in the mobile device;
recognizing that at least one of the applications is selected in the list;
determining whether the mobile device is currently connected to any access point;
when there is any access point currently connected, displaying connection information about the connected access point; and
when recognizing the proximity to or contact with the short-range communication tag, inputting identification information about the selected application, a web address to be accessed, and the connection information about the access point into the short-range communication tag.

8. The method of claim 7, wherein the inputting of the function-related information further includes:
when there is no access point currently connected, displaying an input window;
receiving connection information about an access point through the input window; and
when recognizing the proximity to or contact with the short-range communication tag, inputting the identification information about the selected application, the web address to be accessed, and the received connection information about the access point into the short-range communication tag.

9. The method of claim 8, wherein the reading of the function-related information includes reading the access point connection information, the application identification information and the web address from the short-range communication tag, and wherein the performing of the function includes:
performing a connection with the access point according to the access point connection information;
executing the application according to the application identification information;
accessing a web server according to the web address;
determining whether application-related data stored in the mobile device is identical to application-related data registered in the web server;
when both data are not identical to each other, receiving the application-related data from the web server to update the data; and
when both data are identical to each other, ending a data synchronization process.

10. The method of claim 1, wherein the inputting of the function-related information further includes:
performing a connection with an access point;
recognizing that a menu item for the registration of an electronic device is selected in a tag menu;
displaying a list of the electronic devices connected to the connected access point;
recognizing that at least one of the electronic devices is selected in the list; and
when recognizing the proximity to or contact with the short-range communication tag, inputting connection information about the connected access point and identification information about the selected electronic device into the short-range communication tag.

11. The method of claim 10, further comprising:
after the inputting of the function-related information, executing contents stored in the mobile device.

12. The method of claim 11, wherein the reading of the function-related information includes reading the access point connection information and the electronic device identification information from the short-range communication tag, and
wherein the performing of the function includes:
performing a connection with the access point according to the access point connection information;
searching for the electronic device according to the electronic device identification information; and
sending the executed contents to the electronic device.

13. A mobile device for performing a function thereof by using a short-range communication, the mobile device comprising:
an information inputting unit configured to input function-related information into a short-range communication tag;
a short-range communication module unit configured to detect proximity to or contact with the short-range communication tag;
an information reading unit configured to read the function-related information from the short-range communication tag; and
a function performing unit configured to perform a function correlated with the function-related information,
wherein inputting function-related information comprises:
recognizing that a menu item for the registration of a short-range communication device is selected in a tag menu;
determining whether the mobile device is currently connected to any short-range communication device;
when there is any short-range communication device currently connected, displaying a list of the connected short-range communication devices;
recognizing that at least one of the short-range communication devices is selected in the list; and
when recognizing the proximity to or contact with the short-range communication tag, inputting connection information about the selected short-range communication device into the short-range communication tag.

14. The mobile device of claim 13, wherein the information inputting unit is further configured to read the application identification information and the web address from the short-range communication tag, and
wherein the function performing unit is further configured to execute the application according to the application identification information, to access a web server according to the web address, to determine whether application-related data stored in the mobile device is identical to application-related data registered in the web server, if both data are not identical to each other, to receive the application-related data from the web server to update the data, and if both data are identical to each other, to end a data synchronization process.

15. The mobile device of claim 13, further comprising:
an input unit configured to receive a selection of a menu item for the registration of a short-range communication device in a tag menu;
a mobile communication unit configured to determine whether the mobile device is currently connected to any short-range communication device; and
a display unit configured to, if there is any short-range communication device currently connected, display a list of the connected short-range communication devices,
wherein the information inputting unit is further configured to recognize that at least one of the short-range communication devices is selected in the list, and, when recognizing the proximity to or contact with the short-range communication tag, to input connection information about the selected short-range communication device into the short-range communication tag.

16. The mobile device of claim 15, wherein the display unit is configured to, when there is no short-range communication device currently connected, display an input window, and
wherein the information inputting unit is further configured to receive connection information about a short-range communication device through the input window, and, when recognizing the proximity to or contact with the short-range communication tag, to input the received connection information about the short-range communication device into the short-range communication tag.

17. The mobile device of claim 16, wherein the connection information about the short-range communication device includes:
a Bluetooth address and a Personal Identity Number (PIN) code when the short-range communication device is a Bluetooth device; and
a Service Set IDentifier (SSID), a security type, and a password when the short-range communication device is a Wi-Fi device.

18. The mobile device of claim 16, wherein the information reading unit is further configured to read the connection information about the short-range communication device from the short-range communication tag, and wherein the function performing unit is further configured to performing a connection with the short-range communication device according to the connection information.

* * * * *